June 3, 1924.
S. G. RUSSELL
1,496,492
FISHING REEL
Filed June 25, 1923　　2 Sheets-Sheet 2
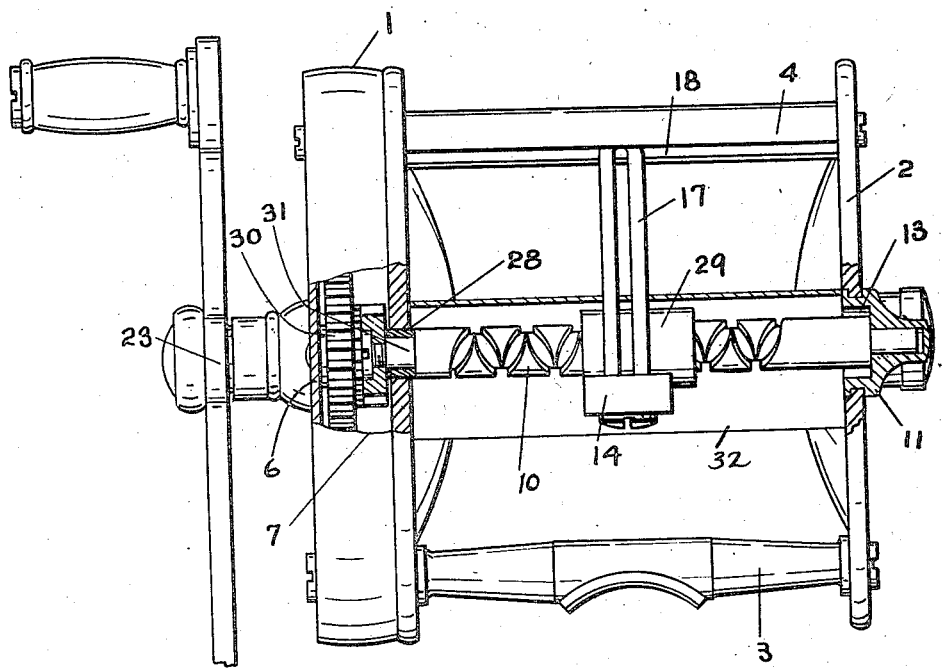
FIG. V.
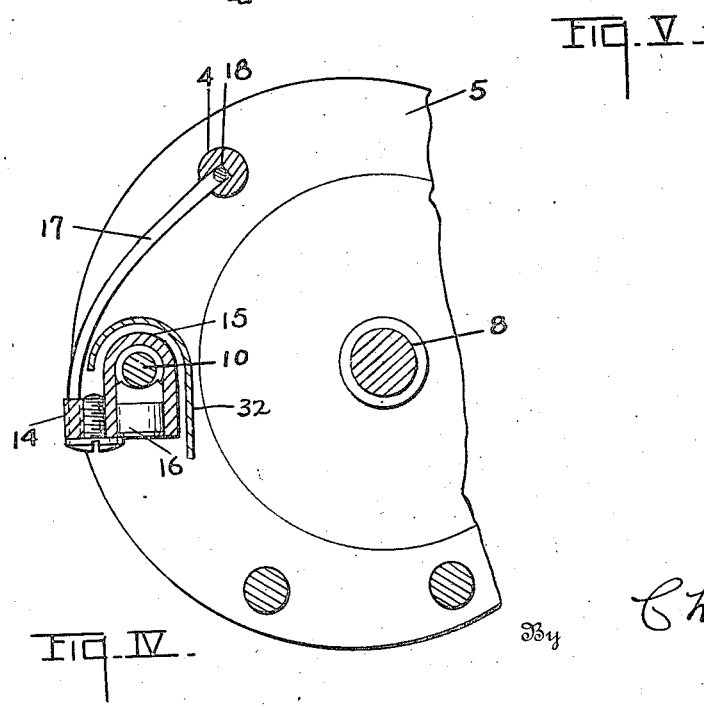
FIG. IV.
Inventor
Samuel G. Russell
By Chappell & Earl
Attorneys

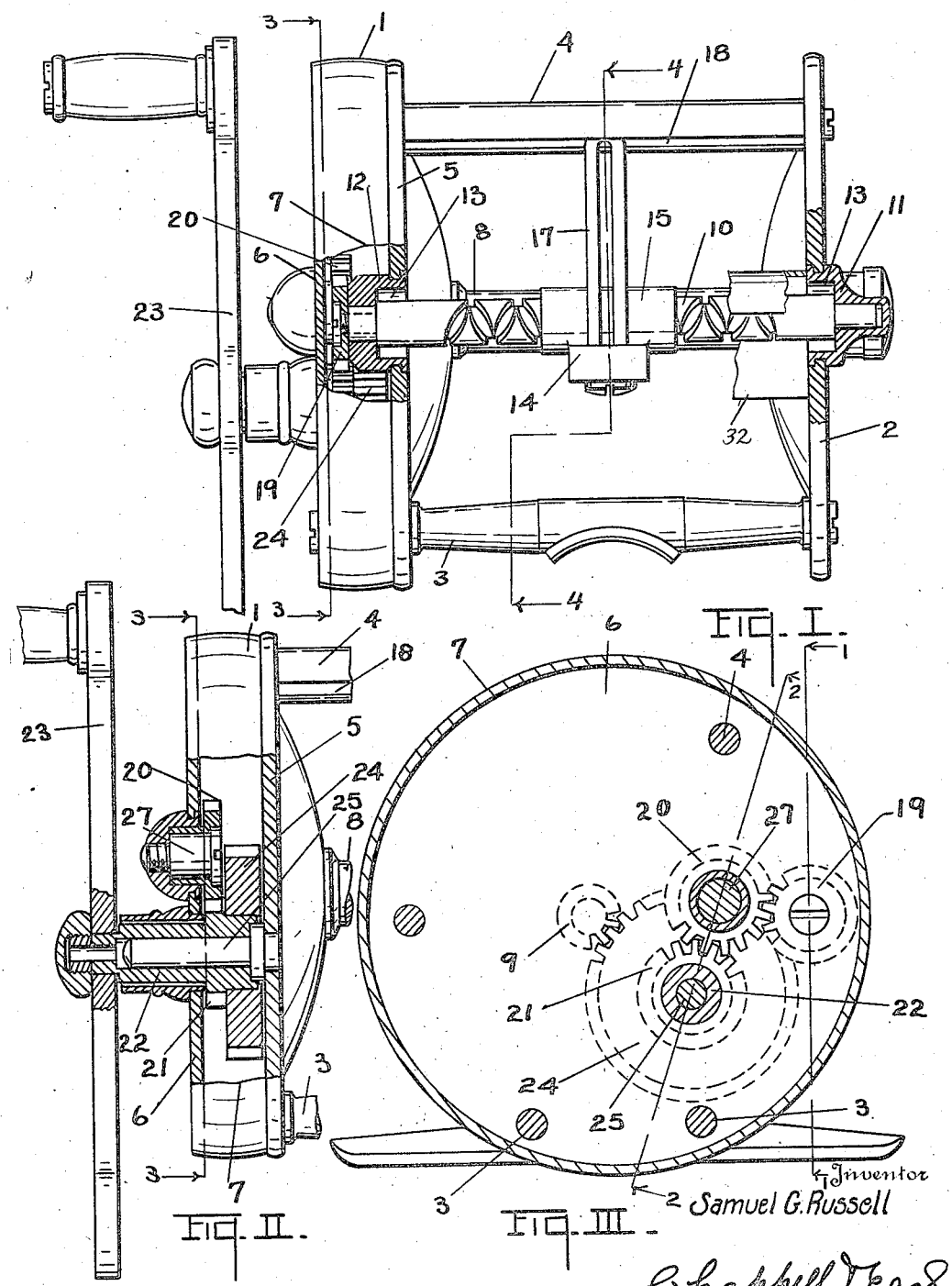

Patented June 3, 1924.

1,496,492

UNITED STATES PATENT OFFICE.

SAMUEL G. RUSSELL, OF KALAMAZOO, MICHIGAN, ASSIGNOR TO SHAKESPEARE COMPANY, OF KALAMAZOO, MICHIGAN.

FISHING REEL.

Application filed June 25, 1923. Serial No. 647,685.

*To all whom it may concern:*

Be it known that I, SAMUEL G. RUSSELL, a citizen of the United States, residing in the city and county of Kalamazoo, State of Michigan, have invented certain new and useful Improvements in Fishing Reels, of which the following is a specification.

This invention relates to improvements in fishing reels.

The main objects of this invention are:

First, to provide an improved fishing reel of the line traversing type which permits of the use of a relatively long line guide carriage without increasing the dimensions of the reel frame.

Second, to provide an improved fishing reel of the line traversing type in which the line guide carriage is not likely to become wedged or inoperative in use.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this application, in which:

Fig. I is a front elevation of a line guide carriage embodying the features of my invention, parts being sectioned and parts broken away to better illustrate structural details.

Fig. II is a fragmentary front elevation partially in section on a line corresponding to line 2—2 of Fig. III.

Fig. III is a transverse section through the head member of the reel on a line corresponding to line 3—3 of Figs. I and II.

Fig. IV is a detail section on a line corresponding to line 4—4 of Fig. I.

Fig. V is a front elevation partially broken away and partially in section of a modified form or embodiment of my invention.

In the drawing similar reference characters refer to similar parts throughout the several views, and the sectional views are taken looking in the direction of the little arrows at the ends of the section lines.

Referring to the drawings, 1 represents the chambered head of the reel and 2 the plate-like tail member which are connected by the cross pillars as 3 and 4.

The head member 1 comprises the inner plate 5 and the outer plate 6, the outer plate having a flange 7 abutting the plate 5. The spool 8 is journaled in the frame and is provided with a pinion 9 within the head chamber.

The reversely threaded traversing shaft 10 is carried by the bearing members 11 and 12, the bearing member 11 being mounted on the tail plate 2 to project outwardly therefrom, the bearing member 12 being mounted on the inner head plate 5 to project into the head chamber. These bearing members 11 and 12 have recesses 13 in their inner ends adapted to receive the ends of the line guide carriage 14 which has a tubular part 15 slidable upon the shaft.

The shaft 10 has unthreaded portions of substantial length at the ends thereof and by providing these recessed bearing members, the carriage may be relatively long and at the same time maintain the full stroke of the carriage. This elongating of the carriage minimizes the clutching or binding action thereof on the shaft and permits the carriage sliding freely and at the same time is not likely to become inoperative.

The carriage is provided with a pawl 16 coacting with the threads of the shaft.

The line guide eye 17 is mounted on the carriage to project upwardly therefrom, its upper end in the structure illustrated engaging the groove 18 of the pillar 4.

The traversing shaft is provided with a pinion 19 which is connected by the pinion 20 to a pinion 21 on the shaft 22 of the crank 23, the crank also being provided with a gear 24 meshing with the pinion 9 of the spool.

The crank shaft 22 is carried by the stub shaft 25 mounted on the inner head plate 5 and projecting outwardly through the outer head plate. The pinion 20 is mounted on the stub shaft 27 carried by the outer head plate 6. The pinion 21 is arranged on the outside of the gear 24, the pinion 20 being arranged in an over-lapping relation thereto, as shown in Figs. II and III.

In the modification shown in Fig. V, the bearing 12 is omitted in the head member, a bearing 28 being substituted therefor, the bearing 28 not having the recessed feature. The carriage 14 is therefore extended at one end 29 only but this modification provides for a carriage of substantial length and is a very decided improvement over the shorter carriages which have been generally employed.

In this embodiment shown in Fig. V, the spool driving gear 30 is arranged at the outside of the traversing shaft gear 31. The housing 32 is disposed between the head and tail member of the frame to over-hang the traversing shaft.

I have not attempted to illustrate and describe other modifications and adaptations of my improvements which I contemplate as I believe the disclosure made will enable those skilled in the art to which my invention relates to embody or adapt the same as may be desired.

Having thus described my invention, what I claim as new and desire to secure by Letters Patent, is:

1. In a fishing reel, the combination with a frame including a chambered head member comprising inner and outer side plates, of a spool, a traversing shaft, a line guide carriage slidable on and operatively associated with said shaft, a bearing member for said shaft mounted on the inner side plate of said head member to project into the head chamber, said bearing member having a recess in its inner end adapted to receive the end of the carriage when at that end of its stroke, a pinion on the end of said traversing shaft, a pinion on said spool, a crank provided with a spool driving gear meshing with said spool pinion and with a traversing shaft driving pinion disposed at the outer side of said spool driving gear, and a pinion mounted on the outer head plate meshing with said pinion on said shaft and said shaft driving pinion.

2. In a fishing reel, the combination with a frame including a chambered head member comprising inner and outer side plates, of a spool, a traversing shaft, a line guide carriage slidable on and operatively associated with said shaft, a bearing member for said shaft mounted on the inner side plate of said head member, a pinion on the end of said traversing shaft, a pinion on said spool, a crank provided with a spool driving gear meshing with said spool pinion and with a traversing shaft driving pinion disposed at the outer side of said spool driving gear, and a pinion mounted on the outer head plate meshing with said pinion on said shaft and said shaft driving pinion.

3. In a fishing reel, the combination with a frame comprising a chambered head member, a plate-like tail member and connecting pillars, of a spool, a traversing shaft having unthreaded end portions of substantial length, a line guide carriage having an elongated tubular part slidable upon and operatively associated with said shaft, and bearing members for said traversing shaft, one of said bearing members being mounted on said tail member to project outwardly therefrom and the other being mounted on said head member to project into the chamber thereof, said bearing members having recesses at their inner ends to receive the ends of the carriage at the ends of its stroke.

4. In a fishing reel, the combination with a frame comprising a chambered head member, a plate-like tail member and connecting pillars, of a spool, a traversing shaft, a reciprocating line guide carriage operatively associated with said shaft, and bearing members for said traversing shaft, one of said bearing members being mounted on said tail member to project outwardly therefrom and the other being mounted on said head member to project into the chamber thereof, said bearing members having recesses at their inner ends to receive the ends of the carriage at the ends of its stroke.

5. In a fishing reel, the combination of a frame comprising end members, a spool, a traversing shaft having unthreaded portions of substantial length at each end thereof, a line guide carriage operatively associated with and having an elongated tubular part slidably engaging the shaft, and bearing members for said shaft mounted on said frame end members, said bearing members having recesses at their inner ends adapted to receive the ends of the carriage at the ends of its stroke, thereby permitting the use of a relatively long carriage.

6. In a fishing reel, the combination of a frame, a spool, a traversing shaft, a carriage slidable upon and operatively associated with said shaft, bearing members for said shaft mounted on said frame, said bearing members having recesses at their inner ends adapted to receive the ends of the carriage at the ends of its stroke thereby permitting the use of a relatively long carriage, and a line guide eye carried by said carriage.

7. In a fishing reel, the combination of a frame, a spool, a traversing shaft, a carriage slidable upon and operatively associated with said traversing shaft, a bearing member for said shaft mounted on said frame, a recess at its inner end adapted to receive the end of the carriage at that end of its stroke, and a line guide eye carried by said carriage.

8. In a fishing reel, the combination of a frame, a spool, a traversing shaft, a reciprocating line guide carriage operatively associated with said shaft, and bearing members for said shaft mounted on said frame, said bearing members having recesses at their inner ends adapted to receive the ends of the carriage at the ends of its stroke thereby permitting the use of a relatively long carriage.

9. In a fishing reel, the combination of a frame, a spool, a traversing shaft, a reciprocating line guide carriage operatively associated with said traversing shaft, and a bearing member for said shaft mounted on said frame and having a recess at its inner end adapted to receive the end of the carriage at that end of its stroke.

10. In a fishing reel, the combination with a frame including a chambered head member, of a spool, a traversing shaft, a line guide carriage slidable on and operatively associated with said shaft, and a bearing member for said shaft mounted on said head member to project into the head chamber, said bearing member having recesses in its inner end adapted to receive the end of the carriage when at that end of its stroke.

In witness whereof, I have hereunto set my hand.

SAMUEL G. RUSSELL. [L. S.]